US010036317B2

(12) United States Patent
Lebel

(10) Patent No.: US 10,036,317 B2
(45) Date of Patent: Jul. 31, 2018

(54) CAPACITY CONTROL OF TURBINE BY THE USE OF A REHEAT COMBUSTOR IN MULTI SHAFT ENGINE

(71) Applicant: INDUSTRIAL TURBINE COMPANY (UK) LIMITED, Frimley, Camberley, Surrey (GB)

(72) Inventor: Jean-Francois Lebel, Beaconsfield (CA)

(73) Assignee: INDUSTRIAL TURBINE COMPANY (UK) LIMITED, Camberley (GB)

( * ) Notice: Subject to any disclaimer, the term of this patent is extended or adjusted under 35 U.S.C. 154(b) by 738 days.

(21) Appl. No.: 14/196,847

(22) Filed: Mar. 4, 2014

(65) Prior Publication Data
US 2014/0250904 A1 Sep. 11, 2014

Related U.S. Application Data

(60) Provisional application No. 61/773,103, filed on Mar. 5, 2013, provisional application No. 61/773,100, filed on Mar. 5, 2013.

(51) Int. Cl.
*F02C 9/24* (2006.01)
*F02C 6/00* (2006.01)

(52) U.S. Cl.
CPC ............... *F02C 6/003* (2013.01); *F02C 9/24* (2013.01); *F05D 2270/301* (2013.01)

(58) Field of Classification Search
CPC .... F02C 3/14; F02C 6/003; F02C 9/26; F02C 9/28; F02C 9/00; F02C 9/24; F02C 9/34;
(Continued)

(56) References Cited

U.S. PATENT DOCUMENTS 3,315,467 A 4/1967 De Witt
3,777,479 A 12/1973 Hagen
(Continued)

FOREIGN PATENT DOCUMENTS

CN 101498240 A 8/2009
FR 1006682 A * 4/1952 ............. F02C 3/305
(Continued)

OTHER PUBLICATIONS

Wikipedia the free encyclopedia, Rayleigh Flow (Jan. 2013), Wikipedia, Revision as of 14:29, Jan. 30, 2013.*
(Continued)

*Primary Examiner* — William H Rodriguez
*Assistant Examiner* — Jason H Duger
(74) *Attorney, Agent, or Firm* — Beusse Wolter Sanks & Maire

(57) ABSTRACT

One example of a gas turbine engine can include a first compressor and a first turbine connected to the first compressor by a first shaft. The engine can include a reheat combustor, which is disposed downstream of the first turbine, and a second turbine, which is disposed downstream of the reheat combustor. The engine can further include a second compressor, which is connected to the second turbine by a second shaft and is disposed upstream of the first compressor. The first and second turbines can be disconnected from one another, and the first and second compressors can be disconnected from one another. The second compressor may have an outlet including a flow to the first compressor, such that the first and second turbines provide a shaft worksplit. The reheat combustor can be configured to receive fuel and generate a reheat exit temperature, so as to control an apparent capacity of the second turbine based on a plurality of parameters of the second compressor.

15 Claims, 8 Drawing Sheets

(58) Field of Classification Search
CPC .... F02C 9/266; F02C 9/48; F02C 9/52; F02C 9/54; F23R 2900/03341; F05D 2270/301; F05D 2270/303; F05D 2270/304; F05D 2270/306; F23N 2037/02; F23N 2037/04; F02K 1/17; F02K 3/10; F02K 3/11
See application file for complete search history.

(56) References Cited

U.S. PATENT DOCUMENTS

| | | | |
|---|---|---|---|
| 3,842,595 A | 10/1974 | Smith et al. | |
| 4,009,569 A | 3/1977 | Kozlin | |
| 4,030,288 A | 6/1977 | Davis et al. | |
| 4,159,625 A * | 7/1979 | Kerr | F02K 1/17 60/204 |
| 4,222,235 A * | 9/1980 | Adamson | F02C 6/003 60/226.1 |
| 4,418,528 A | 12/1983 | Pellow | |
| 4,773,213 A * | 9/1988 | Krukoski | F02C 9/28 60/39.281 |
| 4,896,499 A | 1/1990 | Rice | |
| 5,022,145 A | 6/1991 | Brawerman et al. | |
| 5,184,460 A | 2/1993 | Franciscus et al. | |
| 5,313,782 A | 5/1994 | Frutschi et al. | |
| 5,347,806 A | 9/1994 | Nakhamkin | |
| 5,357,748 A * | 10/1994 | Khalid | F02C 9/54 60/204 |
| 5,524,430 A | 6/1996 | Mazeaud et al. | |
| 5,911,680 A | 6/1999 | Takeoka | |
| 5,921,075 A | 7/1999 | Shimoyama et al. | |
| 6,079,197 A | 6/2000 | Attia | |
| 6,691,519 B2 | 2/2004 | Little | |
| 6,817,187 B2 | 11/2004 | Yu | |
| 7,007,472 B2 * | 3/2006 | Baize | F02D 23/00 60/602 |
| 7,254,951 B2 | 8/2007 | Lockwood, Jr. | |
| 7,404,294 B2 | 7/2008 | Sundin | |
| 7,584,616 B2 * | 9/2009 | Brautsch | F02C 7/228 60/39.17 |
| 8,006,477 B2 | 8/2011 | Dinu | |
| 8,256,202 B1 | 9/2012 | Paulino | |
| 2002/0148213 A1 | 10/2002 | Yu | |
| 2007/0033945 A1 | 2/2007 | Goldmeer et al. | |
| 2007/0157595 A1 | 7/2007 | Lockwood | |
| 2009/0064654 A1 * | 3/2009 | Kirzhner | F02C 6/02 60/39.17 |
| 2009/0193783 A1 | 8/2009 | Sylvain | |
| 2009/0301054 A1 | 12/2009 | Simpson et al. | |
| 2012/0006031 A1 | 1/2012 | Lebegue et al. | |
| 2012/0017601 A1 | 1/2012 | Eroglu et al. | |
| 2012/0324903 A1 | 12/2012 | Dewis | |
| 2013/0104521 A1 | 5/2013 | Kupratis | |
| 2014/0250904 A1 | 9/2014 | Lebel | |

FOREIGN PATENT DOCUMENTS

| | | |
|---|---|---|
| GB | 2373299 | 9/2002 |
| GB | 2373299 A | 9/2002 |
| JP | S337755 | 9/1958 |
| JP | S42023846 | 11/1967 |
| JP | H03100331 A | 4/1991 |
| JP | H03175117 A | 7/1991 |
| JP | H05179904 A | 7/1993 |
| JP | 2001140657 A | 5/2001 |
| JP | 2002285860 A | 10/2002 |
| JP | 2003083081 A | 3/2003 |
| JP | 2011102548 A | 5/2011 |
| JP | 2016510851 A | 4/2016 |
| WO | 03021097 A1 | 3/2003 |

OTHER PUBLICATIONS

JP Office Action dated Aug. 8, 2016, for JP application No. 2015561602.
JP Office Action dated Sep. 5, 2016, for JP application No. 2015561332.
EP Examination Report dated Jul. 13, 2016, for EP application No. 13824059.3.
Bringhenti C. et al: "Study of an Industrial Gas Turbine With Turbine Stators Variable Geometry", IX Congresso Brasileiro De Engenharia E Ciências Térmicas 9th Brazilian Congress of Thermal Engineering and Sciences, ABCM Proceedings of the ENCIT 2002, Paper CIT02-0885XP055117077, Retrieved from the Internet: URL:http://www.abcm.org.br/pt/wp-content/anais/encit/2002/Paper-title/31/CIT02-0885.PDF [retrieved on May 8, 2014]; 2002.
JP Decision to Grant dated Jul. 24, 2017, for JP patent application No. 2015-561332.

* cited by examiner

CAPACITY CONTROL OF TURBINE BY THE USE OF A REHEAT COMBUSTOR IN MULTI SHAFT ENGINE

CROSS-REFERENCE TO RELATED APPLICATIONS

This application claims priority to U.S. Provisional Patent Application Nos. 61/773,100 and 61/773,103, filed Mar. 5, 2013, the contents of which are hereby incorporated in their entirety.

FIELD OF TECHNOLOGY

An improved gas turbine engine is disclosed, and more particularly, a method and apparatus to control a core parameter of a gas turbine engine having a reheat combustor and scheduling a fuel flow in the reheat combustor. The core parameter can be indicative of any physical quantity present in the gas turbine carcass, such as compressor pressure ratio, compressor flow, engine inlet flow, and engine pressure ratio.

BACKGROUND

Multishaft gas turbines are used in a number of application including aircraft engines, power generation plants and pipeline compression duty applications. When these gas turbines operate beyond the scope of their design power, the compressors operate beyond the scope of their intended operating conditions, and handling bleed valves are used to restore the compressor operating point to reasonable values. However, these handling bleed valves are can somewhat diminish cycle efficiency.

It is therefore desirable to provide a multishaft gas turbine engine that can restore the compressor operating point to predetermined reasonable values without reducing the cycle efficiency.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Figure 1:
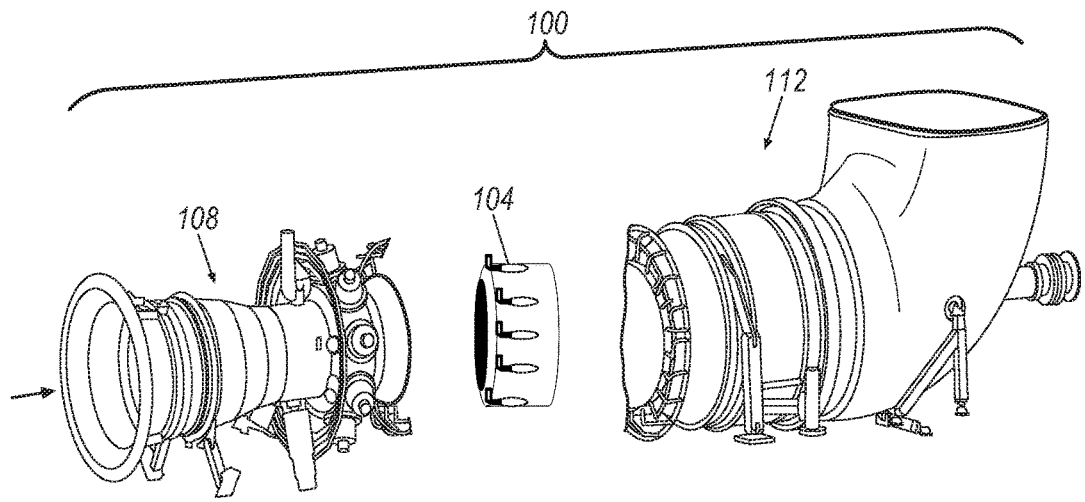
FIG. 1 illustrates an exploded perspective view of an exemplary gas turbine engine having a gas generator, a power turbine and a reheat combustor integrated between the gas generator and the power turbine.

Referring now to the discussion that follows and also to the drawings, illustrative approaches are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

One example of a gas turbine engine can include a first compressor and a first turbine connected to the first compressor by a first shaft. The engine can include a reheat combustor, which is disposed downstream of the first turbine, and a second turbine, which is disposed downstream of the reheat combustor. The engine can further include a second compressor, which is connected to the second turbine by a second shaft and is disposed upstream of the first compressor. The first and second turbines can be disconnected from one another, and the first and second compressors can be disconnected from one another. The second compressor may have an outlet including a flow to the first compressor, such that the first and second turbines provide a shaft worksplit. The reheat combustor can be configured to receive fuel and generate a reheat exit temperature, so as to control an apparent capacity of the second turbine based on a plurality of parameters of the second compressor. In this respect, this exemplary engine can include two turbines that are disconnected from one another and drive separate compressors, so as to control the work split between the two compressors that are positioned in sequence with respect to each other and hence a core engine parameter, which may include a compressor pressure ratio and an engine inlet flow.

Figure 10:
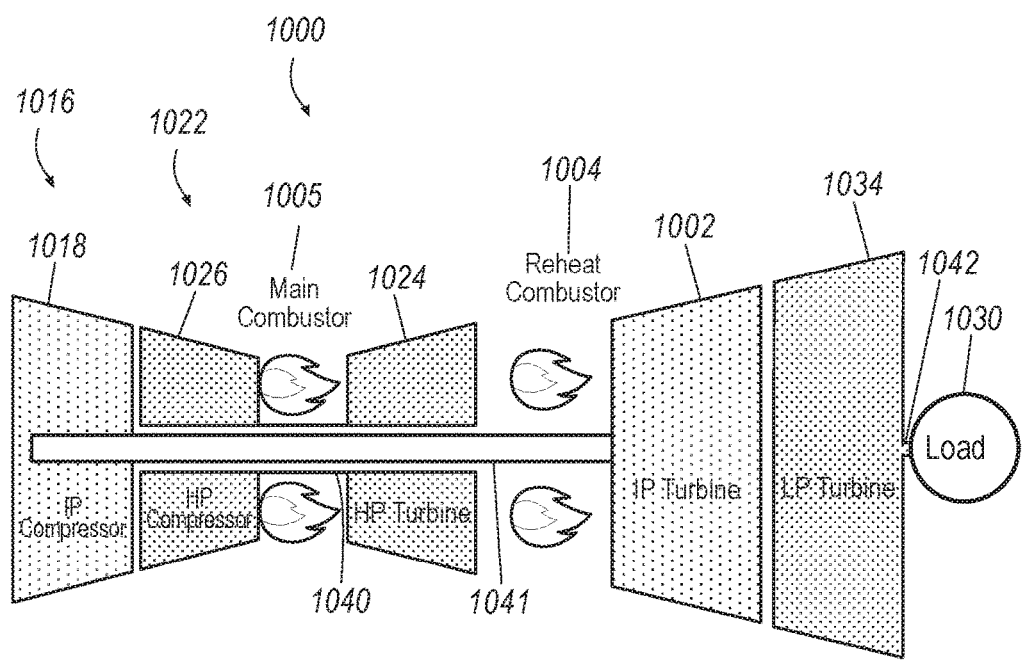
FIG. 10 illustrates a schematic diagram of still another exemplary gas turbine engine, which includes a reheat combustor disposed between the HP turbine and the IP turbine.

Referring to FIG. 10, one exemplary gas turbine engine 1000 can include a high pressure shaft assembly 1022 ("HP shaft assembly") and an intermediate pressure shaft assembly 1016 ("IP shaft assembly"). The IP shaft assembly 1016 may include an IP turbine 1002 and an IP compressor 1018, which are connected to one another by an intermediate pressure shaft 1041 ("IP shaft"). Moreover, the HP shaft assembly 1022 can include an HP turbine 1024 and HP compressor 1026, which are connected to one another by a high pressure shaft 1040 ("HP shaft"). The engine 1000 can further include a lower pressure turbine 1034 ("LP turbine") that is connected to a load 1030 by a low pressure shaft 1042 ("LP shaft"). Examples of the load 1030 can include an electrical generator, a propulsive fan, a pipeline compressor, a pump or a propeller.

The HP shaft 1040, the IP shaft 1041 and the LP shaft 1042 are not connected to one another but rather are fluidly coupled to one another. In particular, the IP compressor exit flow is the HP compressor entry flow. The HP turbine exit flow is the IP turbine inlet flow, and the IP turbine exit flow is the LP turbine inlet flow. In this embodiment, the reheat combustor 1004 is placed between the HP turbine 1024 and the IP turbine 1002, so as to actively control the work split of the total compression work between the two compressors 1018, 1026.

The apparent capacity $Q_1$ (corrected flow) of the IP turbine 1002 ("downstream turbine"), which is disposed downstream of the reheat combustor 1004, may be controlled by scheduling fuel to the reheat combustor 1004. The downstream turbine inlet real capacity $Q_2$ (corrected flow) of the IP turbine 1002 can be expressed through the following Equation 1 for a given turbine and is fairly flat across a turbine operation regime when the turbine is chocked and the exhaust gas constituent does not vary substantially.

$$Q_2 = W_2 \sqrt{T_2}/P_2 \quad \text{(Equation 1)}$$

Re-arranging equation 1:

$$W_2 = Q_2 P_2/\sqrt{T_2} \quad \text{(Equation 2)}$$

The apparent capacity $Q_1$ (corrected flow) or exit real capacity (corrected flow) of the HP turbine 1024 can be expressed through the following Equation 3.

$$Q_1 = W_1 \sqrt{T_1}/P_1 \quad \text{(Equation 3)}$$

In this respect, $Q_1$ will not be only a function of the downstream turbine geometry because it is disposed between the chocked area and a component where the reheat combustor 1004 adds non-negligible heat that results in a temperature rise.

Now, assuming cooling air extraction or return in the combustor, and considering the additional mass flow introduced by the fuel flow:

$$W_1 = W_2 - W_{fuel} - W_{cooling\ air} \quad \text{(Equation 4)}$$

Incorporating equation 4 into equation 3, Equation 5 can be defined as follows:

$$Q_1 = [W_2 - W_{fuel} - W_{cooling\ air}]\sqrt{T_1}/P_1 \quad \text{(Equation 5)}$$

$$Q_1 = (W_2\sqrt{T_1}/P_1) - (W_{fuel}\sqrt{T_1}/P_1) - (W_{cooling\ air}\sqrt{T_1}/P_1) \quad \text{(Equation 6)}$$

Substituting Equation 2 into Equation 6, we obtain:

$$Q_1 = ((Q_2 P_2/\sqrt{T_2})\sqrt{T_1}/P_1) - (W_{fuel}\sqrt{T_1}/P_1) - (W_{cooling\ air}\sqrt{T_1}/P_1) \quad \text{(Equation 7)}$$

$$Q_1 = (Q_2(P_2/P_1)(\sqrt{T_1}/\sqrt{T_2})) - (W_{fuel}\sqrt{T_1}/P_1) - (W_{cooling\ air}\sqrt{T_1}/P_1) \quad \text{(Equation 8)}$$

$$Q_1 = [(Q_2 P_2 \sqrt{(T_1/T_2)}) - (W_{fuel}\sqrt{T_1}) - (W_{cooling\ air}\sqrt{T_1})]/P_1 \quad \text{(Equation 9)}$$

The ratio $T_1/T_2$ is proportional to the temperature rise, and hence the fuel flow in the reheat combustor, and thus Equation 9 can be simplified into:

$$Q_1 = [(Q_2 P_2\ \text{function}(W_{fuel})) - (W_{fuel}\sqrt{T_1}) - (W_{cooling\ air}\sqrt{T_1})]/P_1 \quad \text{(Equation 10)}$$

By inspection of Equation 10, it can therefore be seen that for a fixed downstream turbine real capacity $Q_2$ (corrected flow), determined by the downstream turbine actual hardware, the resulting variation in apparent capacity $Q_1$ (corrected flow) will be determined by at least a control of fuel flow as the other quantities changes, such as combustor pressure drop, and cooling air fraction will be negligible. Therefore, the apparent capacity, $Q_1$, can be controlled by fuel flow scheduling, which allow for control of core engine parameters. In this respect, proper scheduling of the fuel flow in a way that will be disclosed later in this application may allow for control of selected core engine parameter such as compressor pressure ratio or engine inlet flow An exemplary method of controlling a core parameter of a gas turbine engine can include providing a fuel flow to a reheat combustor so as to control an apparent capacity of a turbine positioned downstream of the reheat combustor as viewed from the upstream turbine. The pressure ratio across the upstream turbine 1024 and the downstream IP turbine 1002 can hence be actively modulated by using an active fuel scheduling (FIGS. 6 and 9) to the reheat combustor 1004, which in turn results in an active control of the power available to the compressor 1018 driven by the downstream IP turbine 1002 and hence its operating point.

Figure 7:
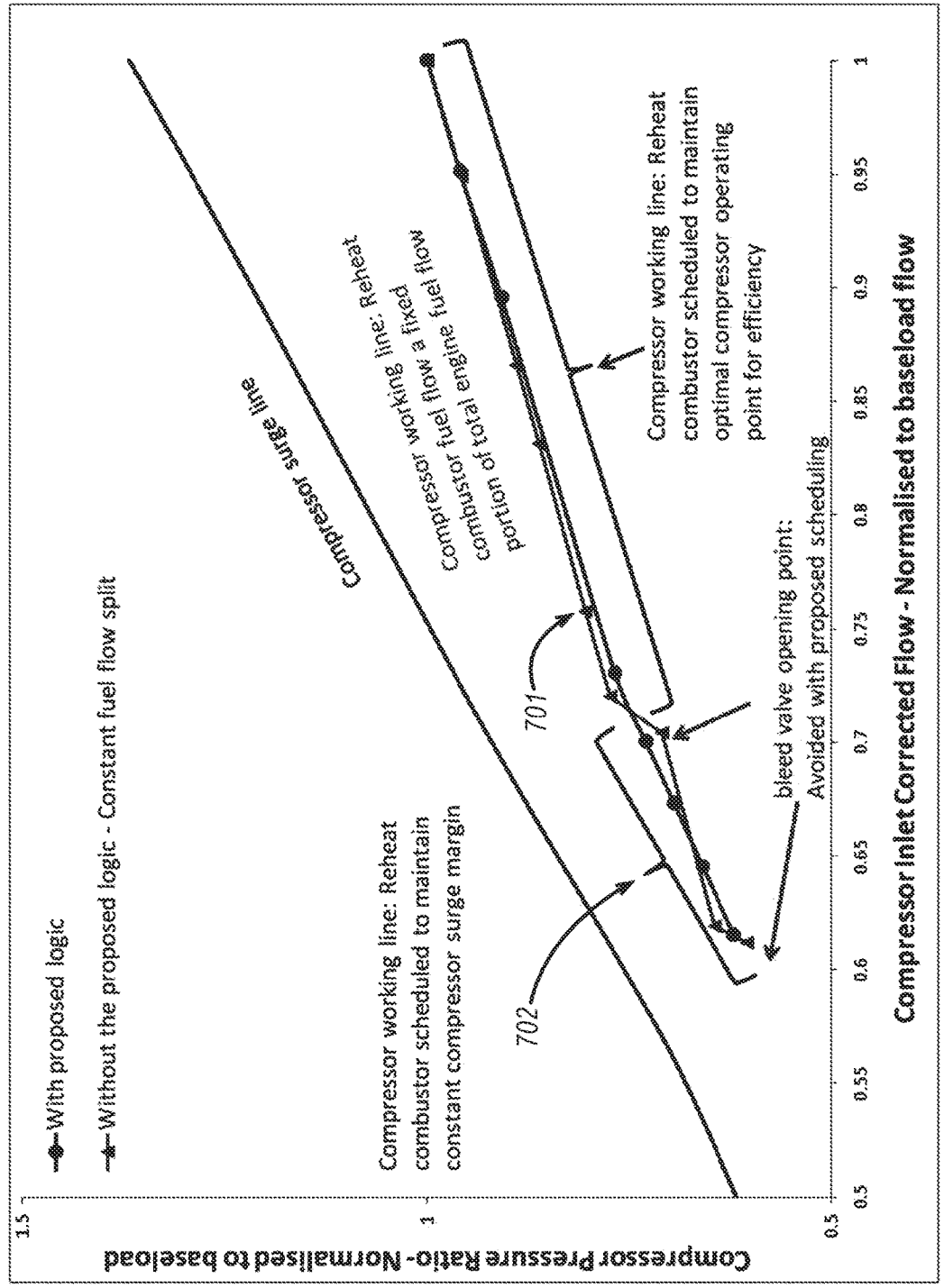
FIG. 7 illustrates an exemplary intermediate pressure compressor working line related to scheduling fuel for the reheat combustor of FIG. 5 using the control method of FIG. 6.
Figure 8:
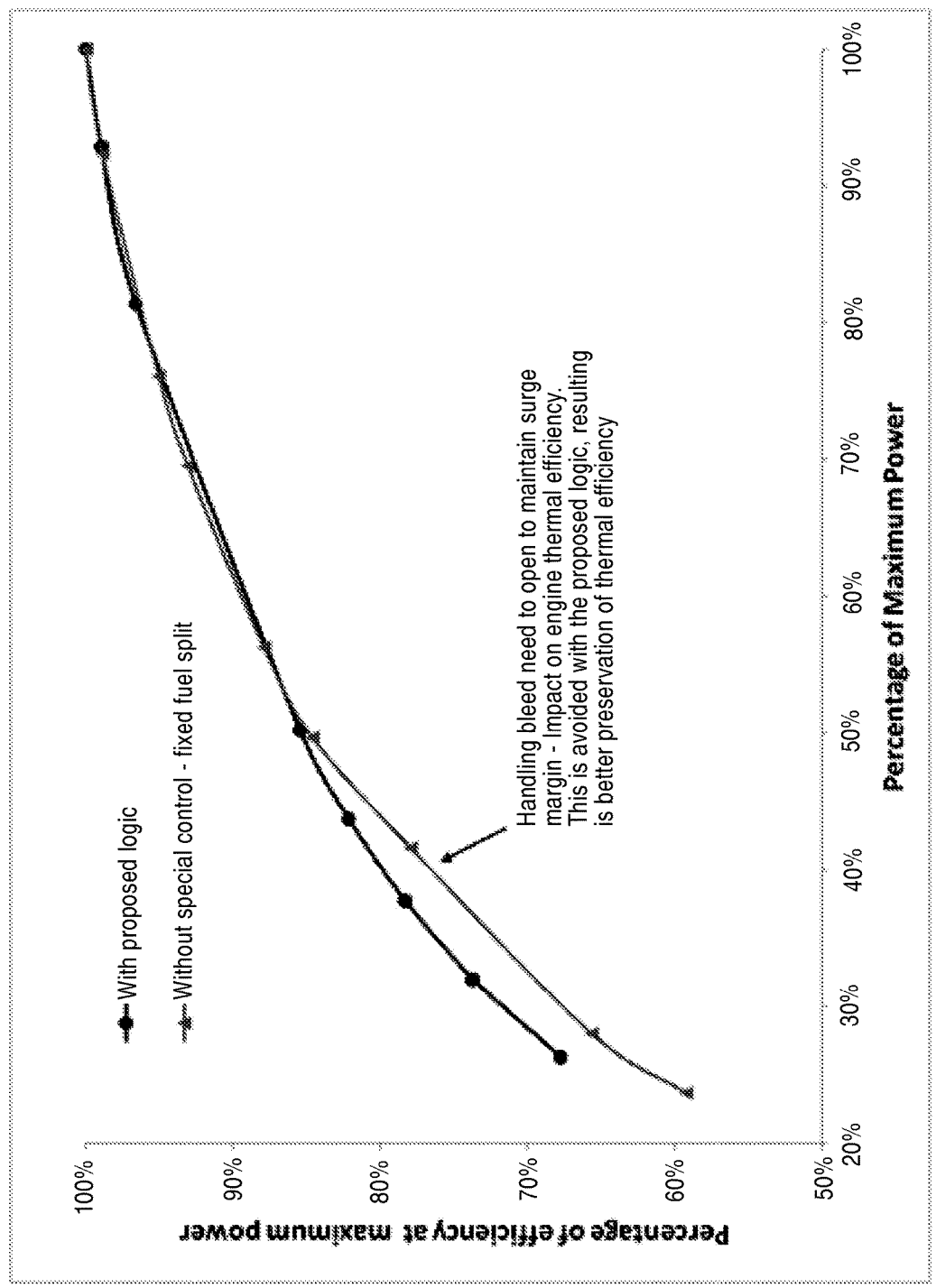
FIG. 8 illustrates an exemplary engine thermal efficiency produced by scheduling fuel for the reheat combustor of FIG. 5 using the control method of FIG. 6.

Referring to FIGS. 7 and 10, the IP compressor 1018 pressure ratio may be actively controlled by the proper scheduling of the fuel split between a main combustor 1005 and the reheat combustor 1004. This feature is beneficial for controlling a compressor to an optimal pressure ratio at a flow to ensure peak efficiency in a higher flow portion 701 or adequate compressor surge margin at part power 702, which may in turn reduce or eliminate the need for overboard handling bleed flow or variable geometry turbine. With attention to FIG. 8, the result may be an improved part load efficiency achieved through higher compressor efficiency and less compressor exit overboard bleed flow at lower power, which is normally required to maintain surge margin. For example, on an aircraft engine, this configuration may permit keeping the compressor exit overboard bleed valve closed on approach thereby reducing fuel consumption and noise.

Figure 6:
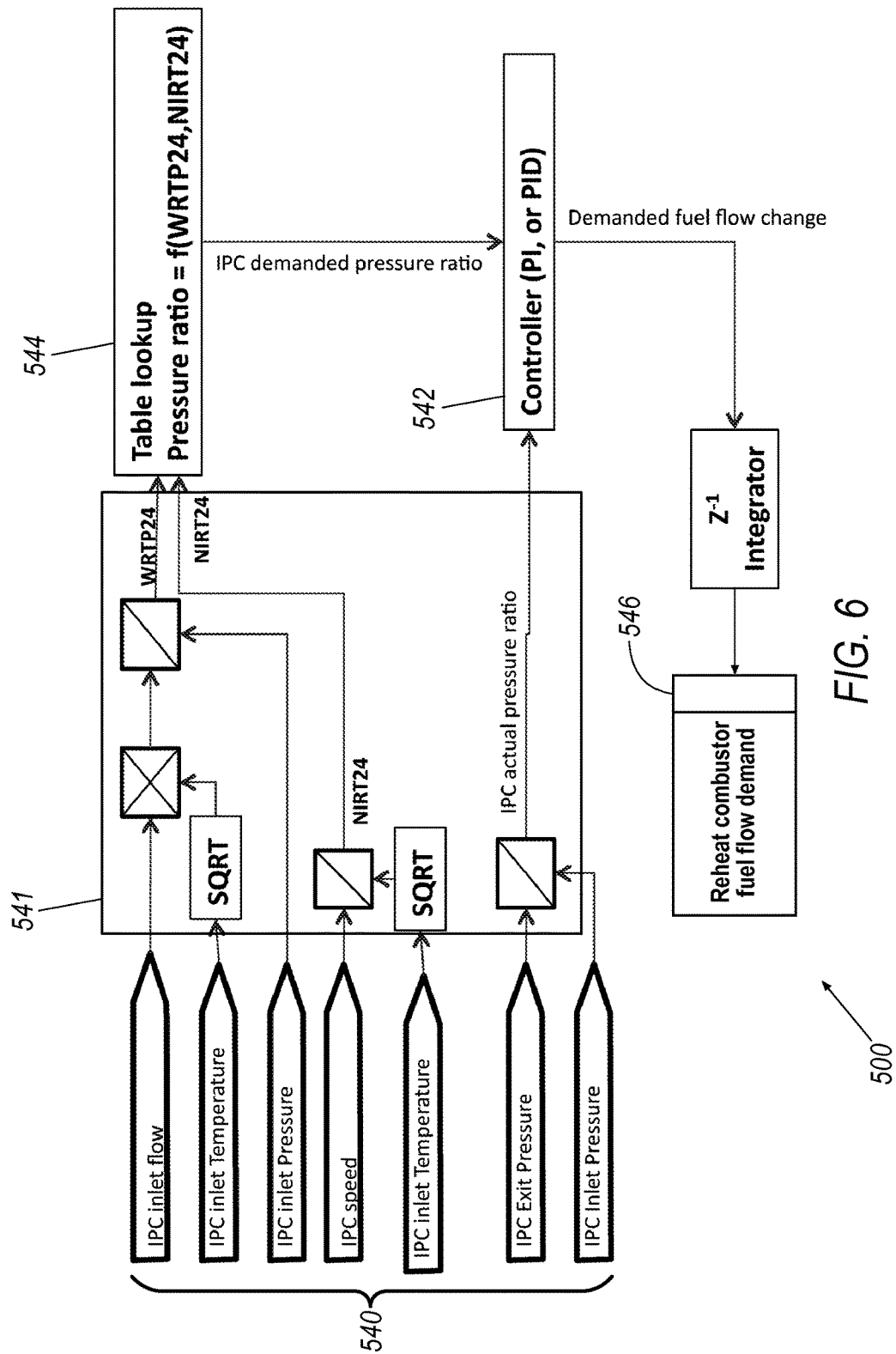
FIG. 6 illustrates an exemplary control method for the gas turbine engine of FIG. 5.
Figure 9:
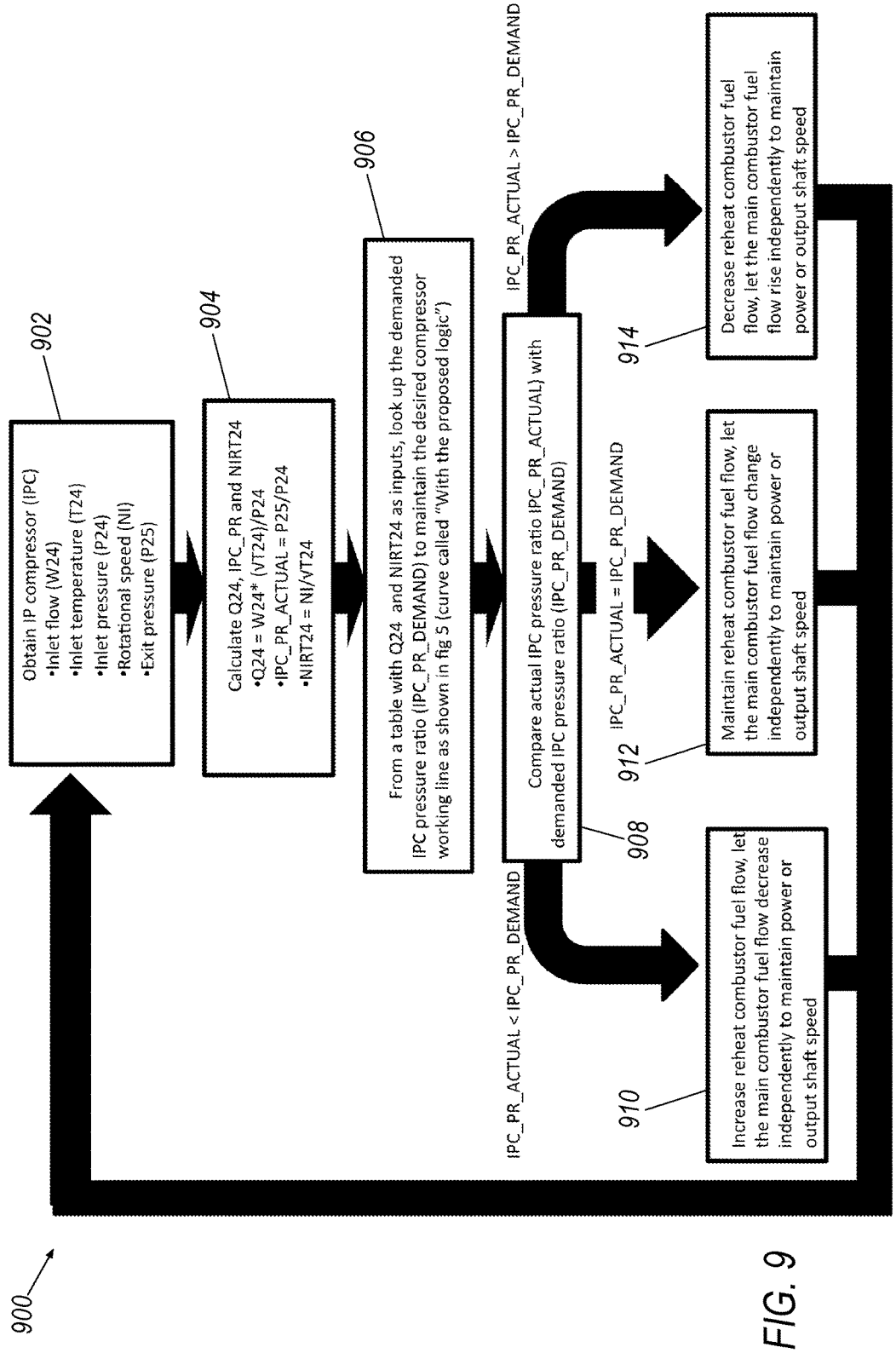
FIG. 9 illustrates a flow chart for an exemplary method of operating the reheat combustor and scheduling fuel for the reheat combustor of the gas turbine engine of FIG. 5.

FIGS. 6 and 9 provide more details on the specific embodiment of the control method 900. At step 902, the gas turbine engine can include a plurality of sensors 540 (FIG. 6) configured to measure or derive an IP Compressor inlet mass flow W24, an inlet temperature T24, an inlet pressure P24, an exit pressure P25 and a rotational speed NI of an IP compressor 1018.

At step 904, the control logic 541 (FIG. 6) determines an IP Compressor corrected flow $Q_{24}$ and an actual pressure ratio IPC_PR_ACTUAL of the IP compressor 1018, and an aerodynamic IP compressor speed, $NIRT_{24}$. The control logic may use the equations as follows to determine the respective values:

$$Q_{24} = (W_{24}\sqrt{T_{24}}/P_{24})$$

$$IPC\_PR\_ACTUAL = (P_{25}/P_{24})$$

$$NIRT_{24} = (NI_{24}/\sqrt{T_{24}})$$

At step 906, the logic determines the demanded pressure ratio IPC_PR_DEMAND. This step may be accomplished by the controller 542 accessing a reference lookup table 544 stored on a non-transitory computer readable medium and then identifying the demanded pressure ratio based on the calculated values for $Q_{24}$ and $NIRT_{24}$.

At step 908, the controller 542 compares the actual IP compressor pressure ratio with the demanded IP compressor pressure ratio. If the actual IP compressor pressure ratio is less than the demanded IP compressor pressure ratio, the method continues to step 910. if the actual IP compressor pressure ratio is equal to the demanded IP compressor pressure ratio, the method proceeds to step 912. If the actual IP compressor pressure ratio is more than the demanded IP compressor pressure ratio, then the method proceeds to step 914.

At step 910, the controller 542 provides an increased fuel flow to the reheat combustor 1004 so as to decrease the apparent capacity (corrected flow) of the IP turbine 1002 positioned downstream of the reheat combustor 1004. By decreasing the apparent capacity of the IP turbine (the downstream turbine), the work across the HP turbine 1024 (the upstream turbine) drops and the work across the IP turbine increases, leading to a change in the worksplit between the two turbines. This in turn decrease the power available to the compressor powered by the HP turbine and increase the power available to the IP compressor powered by the IP turbine. This results in an increase in the pressure ratio of the HP compressor powered by the IP turbine and the IP compressor.

At step 912, the controller 542 maintains a constant fuel flow to the reheat combustor 1004 so as to maintain the apparent capacity of the IP turbine positioned downstream of the reheat combustor 1004. By maintaining the apparent capacity of the downstream IP turbine, the work split between the upstream turbine and the downstream turbine remains constant, this maintains the ratio of power shared between the HP compressor and the IP compressor. This results in a constant pressure ratio of the IP compressor powered by the downstream IP turbine at a fixed total compressive power.

At step 914, the controller 542 provides a decreased fuel flow to the reheat combustor 1004 so as to increase the apparent capacity of the IP turbine positioned downstream of the reheat combustor 1004. By increasing the apparent capacity of the downstream IP turbine, the work across the upstream HP turbine raises and the work across the downstream IP turbine decreases, leading to a change in the worksplit between the two turbines. This in turn decreases the power available to the compressor powered by the downstream IP turbine and increase the power available to the HP compressor powered by the upstream HP turbine. This results in a decrease in the pressure ratio of the IP compressor powered by the downstream IP turbine and the IP compressor.

Figure 5:
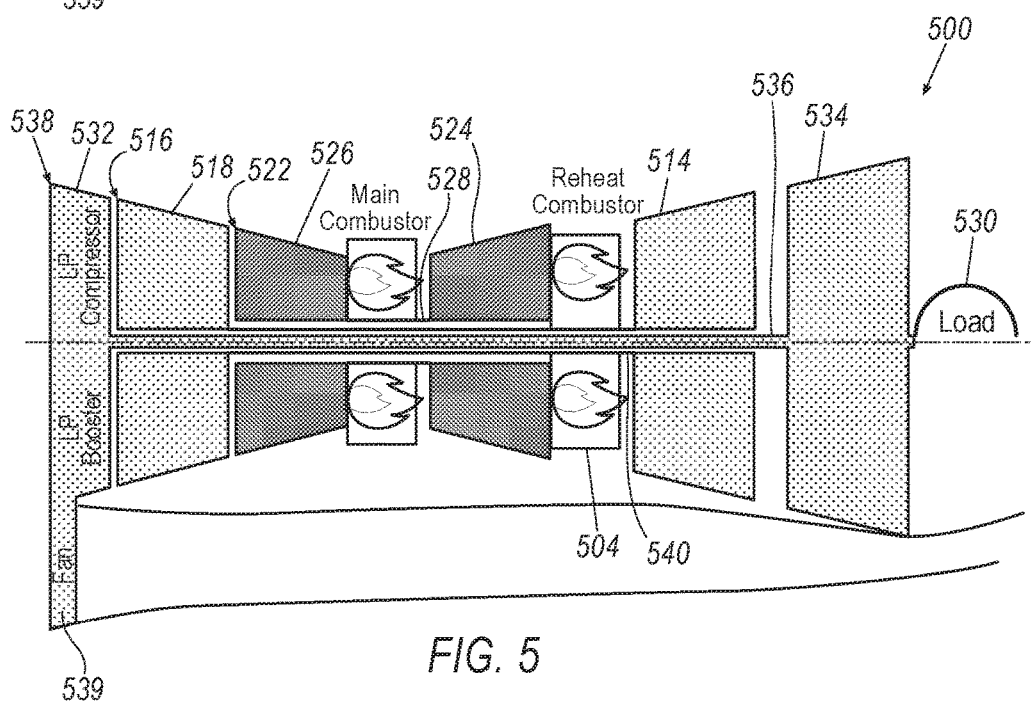
FIG. 5 illustrates a schematic diagram of still another exemplary gas turbine engine, which includes a reheat combustor disposed between the HP turbine and the IP turbine.

With specific attention to FIG. 5, the exemplary engine 500 is substantially similar to the engine 1000 of FIG. 10 and has similar components identified by reference numerals in the 500 series. However, the engine 500 includes an additional LP compressor disposed upstream of the IP compressor 518, while the engine 1000 does not have the same. This engine 500 is a three-shaft engine, which has an HP turbine 524, an IP turbine 514 and an LP turbine 534 driving separate compressors. In particular, a HP shaft assembly 522 may include the HP turbine 524 and HP compressor 526 connected together by a shaft 528. Further, an IP shaft assembly 516 may include the IP turbine 514 and IP compressor 518 connected together by a shaft 540. In addition, a LP shaft assembly 538 may include the LP turbine 534 and the LP compressor 532 connected together by a shaft 536. Moreover, the LP shaft assembly 538 may be connected to the load 530, and the load 530 may be an electrical generator, a propulsive fan 539, a pipeline compressor, a pump, a propeller or other suitable loads.

The HP, IP and LP shaft assemblies are not mechanically connected to one another but rather are fluidly coupled to one another to the extent that the LP compressor exit flow may be the IP compressor entry flow, and the IP compressor exit flow may be the HP compressor entry flow. Furthermore, on a downstream side of the main combustor, the HP turbine exit flow may be the IP turbine inlet flow, and the IP turbine exit flow is the LP turbine inlet flow.

The reheat combustor 504 may be placed between the HP turbine 524 and the IP turbine 514, and similarly to the engine 1000 of FIG. 10, fuel may be scheduled to control the IP compressor pressure ratio such that the IP compressor 518 may be maintained in its optimal operating range of compressor efficiency and surge margin, which may also minimize the surge control overboard bleed flow. This optimal operating range is exemplified in FIGS. 7 and 8, which may provide improved performance and operability benefit below maximum power. This process may extend to both transient and steady state control of gas turbine.

Figure 4:
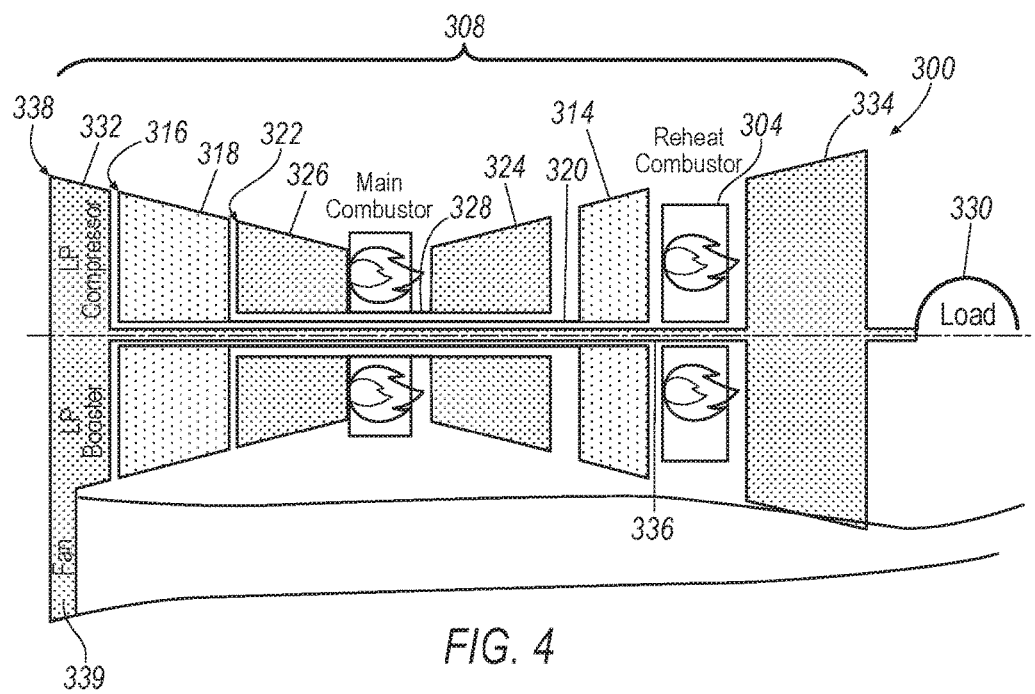
FIG. 4 illustrates a schematic diagram of yet another example of the gas turbine engine of FIG. 3, with the reheat combustor disposed between the IP turbine and the power turbine and further with the power turbine being connected to both a load and the LP compressor.

Referring to FIG. 4, another exemplary gas turbine engine 300 can be similar to the gas turbine engine 500 of FIG. 5 and include similar components that are identified by reference numerals in the 300 series. However, the gas turbine engine 300 has the reheat combustor 304 incorporated between the IP turbine 314 and the LP turbine 334. The reheat combustor 304 is configured to receive fuel and generate a reheat exit temperature so as to control the apparent capacity of the LP turbine 334. Thus, the reheat combustor 304 may be used in conjunction with a three-shaft engine, which includes the reheat combustor 304 disposed between the IP turbine 314 and the LP turbine 334. In this example, the HP turbine 324, the IP turbine 314 and the LP turbine 334 may drive separate compressors. In particular, an IP shaft assembly 316 may include the IP turbine 314 and IP compressor 318, which are connected to one another by a shaft 320. Further, a HP shaft assembly 322 may include the HP turbine 324 and HP compressor 326 connected to one another by a shaft 328. In addition, an LP shaft assembly 338 may include the LP turbine 334 and the LP compressor 332 connected to one another by a shaft 336. Moreover, the LP shaft assembly 338 may be connected to the load 330, and the load 330 may be an electrical generator, a propulsive fan 339, a pipeline compressor, a pump, a propeller or other suitable loads.

The HP, IP and LP shaft assemblies may not be connected to each other or drive mechanisms but rather are fluidly coupled to one another. In particular, on an upstream side of the main combustor, the LP compressor exit flow may be the IP compressor entry flow, and the IP compressor exit flow may be the HP compressor entry flow. Furthermore, on a downstream side of the main combustor, the HP turbine exit flow may be the IP turbine inlet flow, and the IP turbine exit flow is the LP turbine inlet flow.

The fuel schedule for the reheat combustor 304 may be used to control the apparent capacity of the LP turbine 334 to the core engine 308. By varying the apparent capacity of the LP turbine 334 to the core engine 308 as the power increases, the IP compressor inlet mass flow may be controlled to a desired value. For an industrial engine that includes an LP compressor 332 having a rotational speed that is fixed by a load, this fuel scheduling may permit control of the LP compressor working line by fixing its exit mass flow. For a turbofan engine, this scheduling may allow varying the bypass ratio of air between the fan 339 and the core engine 308.

Figure 2:
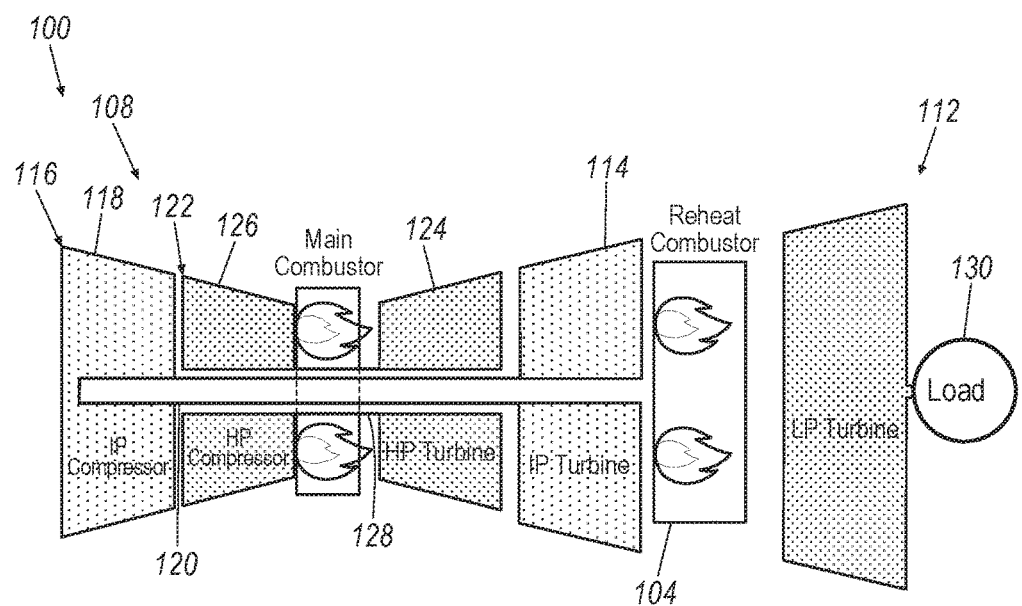
FIG. 2 illustrates a schematic diagram of the gas turbine engine of FIG. 1.
Figure 3:
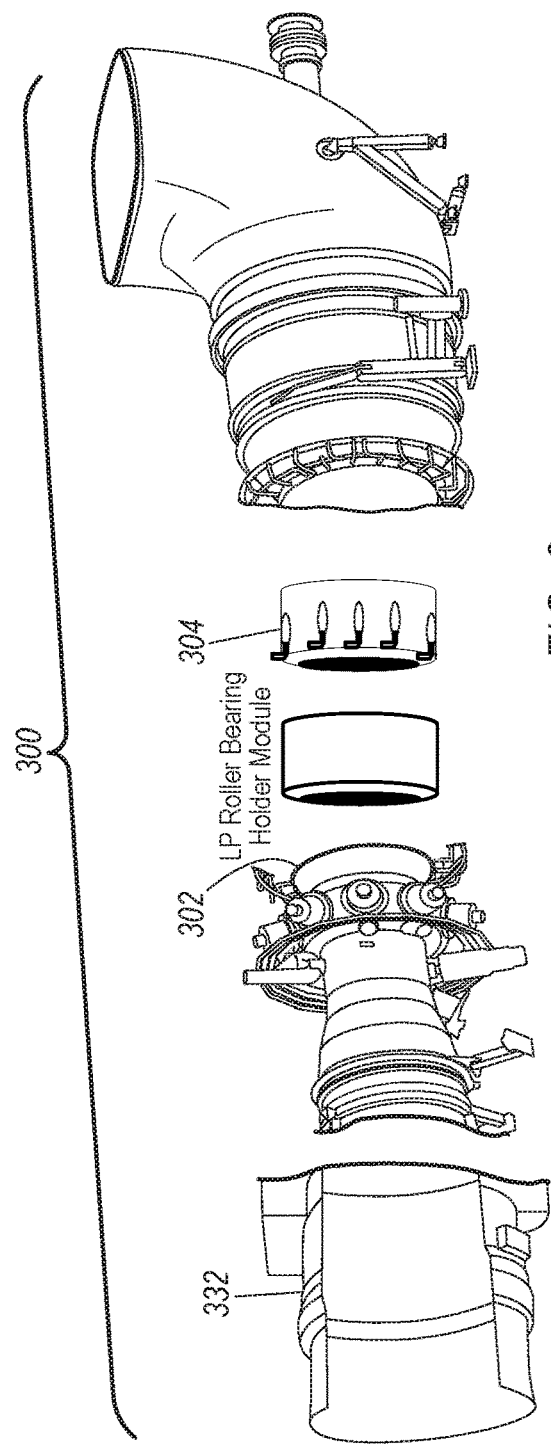
FIG. 3 illustrates an exploded perspective view of another exemplary gas turbine engine having a gas generator, a power turbine, a low pressure roller bearing holder module, a reheat combustor integrated between the gas generator and the power turbine, and a low pressure compressor connected to the low pressure turbine of the power turbine.

In an alternative embodiment, as shown in FIGS. 1 and 2, one exemplary gas turbine engine 100 can include a gas generator 108. The gas generator 108 may include an IP shaft assembly 116 having the IP turbine 114 and IP compressor 118 connected to one another by a shaft 120. The gas generator 108 may further include an HP shaft assembly 122 having the HP turbine 124 and the HP compressor 126 connected to one another by a shaft 128. The HP and IP shaft assemblies 116, 122 may be structurally disconnected from one another, but fluidly or operably coupled to one another to the extent that the fluid driven by an upstream shaft assembly may in turn drive the downstream shaft assembly. The LP turbine 112 is coupled to the load 130 which may be an electrical generator, a propulsive fan, a pipeline compressor, a pump, a propeller, other suitable loads or any combination thereof.

The fuel schedule for the reheat combustor 104 may control the apparent capacity of the LP Turbine 112 to the core engine. By varying the apparent capacity of the LP Turbine 112 to the gas generator 108 as the operating condition varies, the engine inlet mass flow may be adjusted to a target value by using the effect of the change in apparent capacity on the mechanically disconnected core. Control logic may be used to control the inlet flow. In a combined cycle application, control logic may control the engine exhaust flow which may pass through the boiler. However, in another embodiment, the control logic may control engine performance to a set of composite core parameter instead of a single parameter.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A gas turbine engine, comprising:
   a first compressor;
   a first turbine connected to the first compressor by a first shaft;
   a main combustor disposed upstream of the first turbine;
   a reheat combustor downstream of the first turbine;
   a second turbine downstream of the reheat combustor;
   a second compressor connected to the second turbine by a second shaft and disposed upstream of the first compressor;
   a third turbine connected to a load; and
   a controller;
   wherein the first turbine, the second turbine, and the third turbine are disconnected from one another, and the first compressor and the second compressor are disconnected from one another, such that the first turbine and the second turbine provide a worksplit between the first shaft and the second shaft;
   wherein the controller is configured to:
      calculate an actual pressure ratio of the second compressor based on a plurality of parameters of the second compressor;
      calculate a corrected air flow through the second compressor based on the plurality of parameters of the second compressor;
      ascertain a demanded pressure ratio of the second compressor based at least in part on the calculated corrected air flow;
      perform a comparison of the demanded pressure ratio and the actual pressure ratio; and
      adjust a reheat fuel flow to the reheat combustor and a main fuel flow to the main combustor based on the comparison to adjust the actual pressure ratio toward the demanded pressure ratio, thereby controlling an apparent capacity of the second turbine, and
   wherein during the controlling of the apparent capacity of the second turbine by the adjusting of the reheat fuel flow to the reheat combustor and the main fuel flow to the main combustor based on the comparison, the controller decreases the main fuel flow to the main combustor and increases the reheat fuel flow to the reheat combustor in response to the comparison indicating the actual pressure ratio is less than the demanded pressure ratio, and increases the main fuel flow to the main combustor and decreases the reheat fuel flow to the reheat combustor in response to the comparison indicating the actual pressure ratio is greater than the demanded pressure ratio.

2. The gas turbine engine of claim 1, further comprising a plurality of sensors configured to detect the plurality of parameters of the second compressor, wherein the plurality of parameters of the second compressor comprises an inlet flow, an inlet temperature, an inlet pressure, a rotational speed, and an exit pressure.

3. The gas turbine engine of claim 1, wherein the first turbine is a high pressure turbine; and
wherein the first compressor is a high pressure compressor disposed upstream of the main combustor.

4. The gas turbine engine of claim 1, wherein the controller is further configured to calculate an aerodynamic compressor speed of the second compressor, and wherein the demanded pressure ratio is based on the calculated corrected air flow through the second compressor and the calculated aerodynamic compressor speed.

5. The gas turbine engine of claim 2, wherein the corrected air flow through the second compressor is calculated based on the inlet flow, the inlet temperature, and the inlet pressure.

6. The gas turbine engine or claim 1, wherein the load is a third compressor connected to the third turbine by a third shaft.

7. A method of controlling a core parameter of a gas turbine engine, comprising:
providing a first compressor;
providing a first turbine connected to the first compressor by a first shaft;
providing a main combustor disposed upstream of the first turbine;
providing a reheat combustor downstream of the first turbine;
providing a second turbine downstream of the reheat combustor;
providing a second compressor connected to the second turbine by a second shaft and disposed upstream of the first compressor;
providing a third turbine connected to a load; and
providing a controller;
wherein the first turbine, the second turbine, and the third turbine are provided disconnected from one another, and the first compressor and the second compressor are provided disconnected from one another, such that the first turbine and the second turbine provide a worksplit between the first shaft and the second shaft;
providing a reheat fuel flow to the reheat combustor and a main fuel flow to the main combustor;
wherein the controller:
detects a plurality of parameters of the second compressor;
calculates an actual pressure ratio of the second compressor based on the plurality of parameters of the second compressor;
calculates a corrected air flow through the second compressor based on the plurality of parameters of the second compressor;
ascertains a demanded pressure ratio of the second compressor based at least in part on the calculated corrected air flow;
performs a comparison of the demanded pressure ratio and the actual pressure ratio; and adjusts the reheat fuel flow to the reheat combustor and the main fuel flow to the main combustor based on the comparison to adjust the actual pressure ratio toward the demanded pressure ratio, thereby controlling an apparent capacity of the second turbine, and
during the controlling of the apparent capacity of the second turbine by the adjusting of the reheat fuel flow to the reheat combustor and the main fuel flow to the main combustor based on the comparison, the controller:
decreases the main fuel flow to the main combustor and increases the reheat fuel flow to the reheat combustor in response to the comparison indicating the actual pressure ratio is less than the demanded pressure ratio, and
increases the main fuel flow to the main combustor and decreases the reheat fuel flow to the reheat combustor in response to the comparison indicating the actual pressure ratio is greater than the demanded pressure ratio.

8. The method of claim 7, wherein the actual pressure ratio is a ratio between an inlet pressure of the second compressor and an exit pressure of the second compressor.

9. The method of claim 7, wherein the plurality of parameters of the second compressor comprises an inlet flow, an inlet temperature, an inlet pressure, an exit pressure and a rotational speed.

10. The method of claim 9, further comprising calculating the corrected air flow through the second compressor based on the inlet flow, the inlet temperature, and the inlet pressure.

11. The method of claim 10, wherein the demanded pressure ratio is ascertained from a reference lookup table based on at least one of the compressor corrected air flow through the second compressor, the inlet temperature and the rotational speed.

12. The method of claim 7, wherein during the controlling of the apparent capacity of the second turbine by the adjusting of the reheat fuel flow to the reheat combustor and the main fuel flow to the main combustor based on the comparison, the controller maintains the reheat fuel flow to the reheat combustor in response to the comparison indicating the actual pressure ratio is equal to the demanded pressure ratio.

13. The method of claim 7,
wherein the first turbine is a high pressure turbine and the first compressor is a high pressure compressor; and
wherein the second turbine is an intermediate pressure turbine and the second compressor is an intermediate pressure compressor.

14. The method of claim 13, further comprising:
wherein the third turbine is a low pressure turbine and the load is a low pressure compressor connected to the third turbine by a low shaft;
wherein the first shaft, the second shaft and the low shaft are disconnected from one another.

15. A gas turbine engine, comprising:
a high pressure compressor;
a high pressure turbine connected to the high pressure compressor by a high pressure shaft;
an intermediate pressure turbine downstream of the high pressure turbine; and
an intermediate pressure compressor connected to the intermediate pressure turbine by an intermediate pressure shaft and disposed upstream of the high pressure compressor;

a main combustor disposed upstream of the high pressure turbine;
a reheat combustor downstream of the intermediate pressure turbine;
a low pressure turbine disposed downstream of the reheat combustor,
a low pressure compressor connected to the low pressure turbine by a low pressure shaft and disposed upstream of the intermediate pressure turbine; and
a controller;
wherein the high pressure turbine, the intermediate pressure turbine and the low pressure turbine are disconnected from one another, and the high pressure compressor, the intermediate pressure compressor and the low pressure compressor are disconnected from one another such that the intermediate pressure turbine and the low pressure turbine provide a worksplit between the low pressure shaft and the intermediate pressure shaft;
wherein the controller is configured to:
    calculate an actual pressure ratio of the intermediate pressure compressor based on a plurality of parameters of the intermediate pressure compressor;
    calculate a corrected air flow through the intermediate pressure compressor based on the plurality of parameters of the intermediate pressure compressor;
    ascertain a demanded pressure ratio of the intermediate pressure compressor based at least in part on the calculated corrected air flow;
    perform a comparison of the demanded pressure ratio and the actual pressure ratio; and
    adjust a reheat fuel flow to the reheat combustor and a main fuel flow to the main combustor based on the comparison to adjust the actual pressure ratio toward the demanded pressure ratio, thereby controlling an apparent capacity of the intermediate pressure turbine, and
wherein during the controlling of the apparent capacity of the intermediate pressure turbine by the adjusting of the reheat fuel flow to the reheat combustor and the main fuel flow to the main combustor based on the comparison, the controller decreases the main fuel flow to the main combustor and increases the reheat fuel flow to the reheat combustor in response to the comparison indicating the actual pressure ratio is less than the demanded pressure ratio, and increases the main fuel flow to the main combustor and decreases the reheat fuel flow to the reheat combustor in response to the comparison indicating the actual pressure ratio is greater than the demanded pressure ratio.

* * * * *